United States Patent [19]
Grom et al.

[11] 3,781,645
[45] Dec. 25, 1973

[54] INVERTER

[76] Inventors: Jury Ivanovich Grom, ulitsa 9 Gvardeiskoi divizii 58, kv. 40; Vladimir Grigorievich Yatsuk, ulitsa Pervomaiskaya 8, kv. 57, both of Moskovskoi oblasti, U.S.S.R.

[22] Filed: May 1, 1973

[21] Appl. No.: 356,196

[52] U.S. Cl. .................................. 321/45 C, 321/5
[51] Int. Cl. .......................................... H02m 7/52
[58] Field of Search ..................... 321/5, 45 R, 45 C

[56] References Cited
UNITED STATES PATENTS

| | | | |
|---|---|---|---|
| 3,395,328 | 7/1968 | Huntzinger et al. | 321/45 C |
| 3,398,350 | 8/1968 | Ruff | 321/45 C |
| 3,399,336 | 8/1968 | Koppelmann | 321/5 |
| 3,449,654 | 6/1969 | Sheldrake et al. | 321/45 C |
| 3,504,266 | 3/1970 | Schlabach et al. | 321/45 C |

*Primary Examiner*—William M. Shoop, Jr.
*Attorney*—Eric H. Waters et al.

[57] ABSTRACT

An inverter comprising main controlled rectifiers arranged in a 3-phase bridge configuration, shunted by reverse-conducting diodes and connected to a main D.C. source, a switching circuit comprising a switching capacitor and a switching choke coupled into a series string, auxiliary controlled rectifiers interconnected so that one end of said string is connected to three groups of said auxiliary rectifiers in mutual parallel opposition, each said group being coupled with one of the arms of the bridge built around the main controlled rectifiers, whereas the other end of said string is coupled to an arm of a bridge defined by other of said auxiliary rectifiers connected to the main D.C. source, and the switching capacitor is coupled into a diagonal of a symmetrical bridge defined by the rest of said auxiliary rectifiers connected to an additional D.C. source, according to the invention, characterized in that in the switching circuit a symmetrical bridge built around additional diodes is coupled by way of one diagonal to a diagonal of the symmetrical bridge defined by said auxiliary controlled rectifiers, which diagonal includes the switching capacitor, whereas an additional capacitor or a control pulse-generating unit is connected to the other diagonal of said bridge, the output of said control pulse-generating unit being connected with the switching choke circuit.

Such an arrangement permits suppressing overvoltages across the switching capacitor and all the elements of the inverter circuitry.

3 Claims, 4 Drawing Figures

INVERTER

The present invention relates to the field of semiconductor conversion technology and, more particularly, to inverters and may be utilized, for example, in static frequency converters to regulate the speed of squirrel-cage induction motors.

Those skilled in the art known of inverters comprising main controlled rectifiers, for example thyristors, arranged in a 3-phase bridge configuration, shunted by reverse-conducting diodes and connected to a main D.C. source, a switching circuit comprising a switching capacitor and a switching choke coupled into a series string, as well as auxiliary thryistors. Said auxiliary thyristors form three groups of thyristors in mutual parallel opposition, each group being connected to one of the arms of the main thyristor bridge; a symmetrical bridge built around four thyristors connected to an additional D.C. source, and a bridge defined by two thyristors connected to the main D.C. source, one end of said series string being coupled to the common point of said three groups of thyristors, which are connected in mutual parallel opposition, the other end of said string being connected to an arm of said bridge defined by two thyristors, whereas the switching capacitor forming part of this string is coupled into a diagonal of said symmetrical bridge defined by four thyristors.

Prior art devices have a disadvantage consisting in that the voltage across the switching capacitor and hence across the thyristors and diodes of the circuit, may considerably exceed the voltage rating of the inverter source. In said inverter as the bridge built around two switching thyristors coupled to the main D.C. source, is fired, there occurs an oscillatory recharging process of the switching capacitor in the switching circuit including a choke.

The electromagnetic energy stored in the choke by the end of the commutation process is transferred, less losses, to the switching capacitor causing a voltage rise across same and, consequently, across the main reverse-conducting thyristors and diodes. The magnitude of overvoltage depends on the parameters of the circuit built around the switching capacitor and the switching choke, as well as on the load current value.

It is an object of the present invention to suppress over-voltages across the switching capacitor and all circuit elements of an inverter in a broad range of controlled frequencies and voltages.

It is herein contemplated that there shall be provided a switching circuit wherein a symmetrical bridge of additional diodes is coupled by way of one diagonal thereof to a diagonal of a symmetrical bridge built around auxiliary controlled rectifiers (thyristors) including a switching capacitor, whereas an additional capacitor or a control pulse-generating unit is coupled to the other diagonal of said bridge, the output of said control pulse-generating unit being connected to the switching choke circuit.

If the control pulse-generating unit is coupled to one of the diagonals of the bridge additional diode the switching choke is preferably formed by two half-windings series-connected into an arm of the bridge built around the auxiliary controlled rectifiers coupled to the main D.C. source and connected by way of their midpoint with the switching capacitor and it is also preferable to shunt the half-windings of said choke with strings of series-coupled rectifiers and resistors, in which strings the control electrodes of said rectifiers are preferably connected to the control pulse-generating unit.

The invention will be better understood from the following detailed description of inverters embodying the invention with reference to the accompanying drawings, wherein.

It must be borne in mind that each term encountered in the description covers all equivalent elements functioning in a like manner and employed for the same purpose as in the present invention. It must also be borne in mind that other objects and advantages of the present invention, apart from those mentioned above, will be appreciated from the description taken in conjunction with the accompanying drawings.

Figure 1:
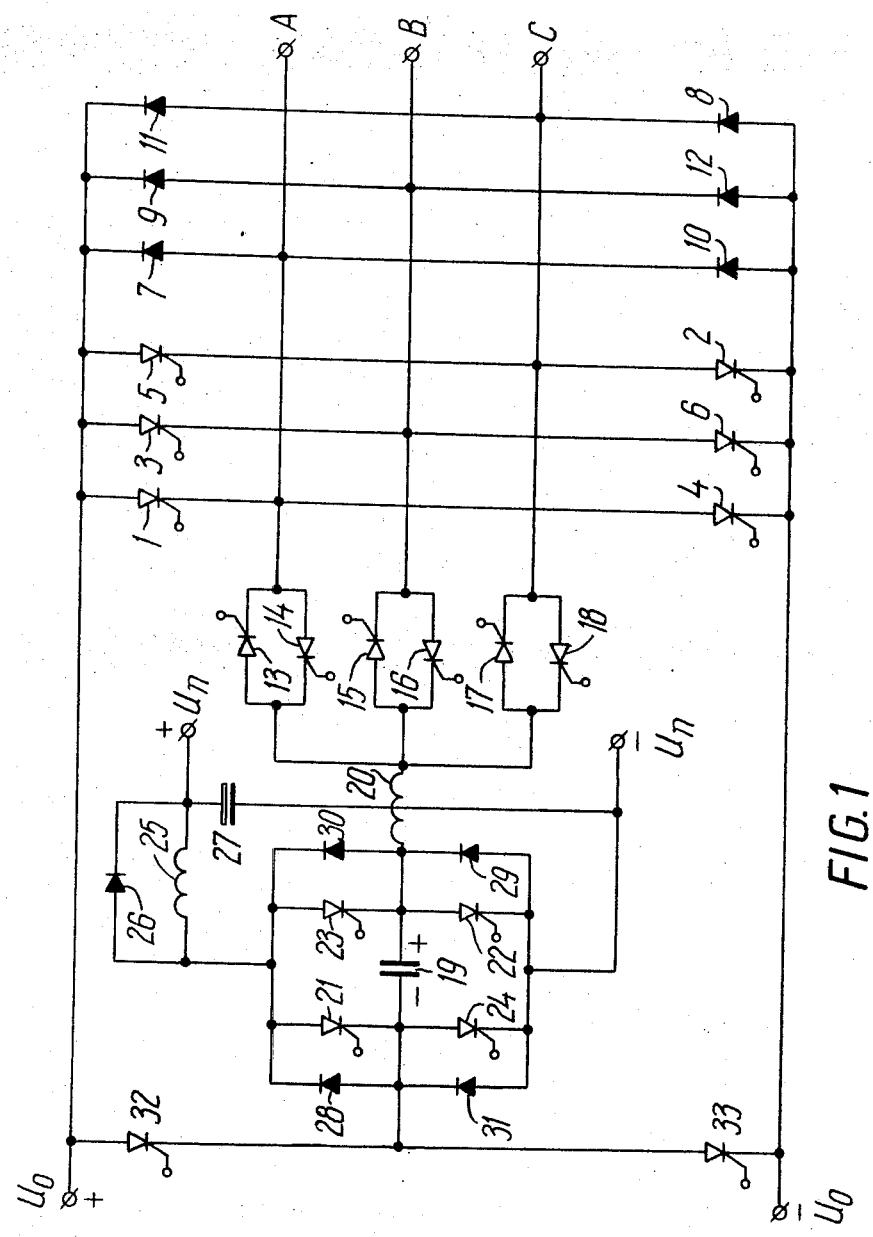
FIG. 1 is a schematic circuit diagram of an inverter comprising an additional capacitor coupled into a diagonal of a symmetrical bridge built around additional diodes.

It will be appreciated from FIG. 1 that the inverter comprises main thyristors 1, 2, 3, 4, 5 and 6 arranged in a 3-phase bridge configuration and supplied from a main D.C. source $U_o$, and reverse-conducting diodes 7, 8, 9, 10, 11 and 12 in parallel opposition with the main thyristors. To a diagonal of the bridge built around the main thyristors 1–6 are connected on one side a three-phase load (phases A, B, C) and on the other side a switching circuit.

The switching circuit comprises three groups of auxiliary thyristors in mutual series opposition, viz. 13 and 14, 15 and 16, 17 and 18, each group coupled with an arm of the bridge built around the main thyristors 1–6; a switching capacitor 19 and a switching choke 20 connected into a series string with one end coupled to the common point of the three groups of thyristors 13–18, whereas the switching capacitor 19 of this string is coupled into a diagonal of a symmetrical bridge built around auxiliary thyristors 21, 22, 23 and 24.

Via an auxiliary choke 25 shunted by a diode 26, said bridge is connected to an electrolytic capacitor 27 and to an additional D.C. source $U_n$ recharging the capacitor 19. Additional diodes 28–31 arranged in a symmetrical bridge configuration, with the diagonals thereof superposed on the diagonals of the symmetrical bridge built around the thyristors 21–24, are coupled in parallel opposition to the thyristors 21–24. The other end of the string composed of the series-connected capacitor 19 and choke 20 is coupled into an arm of a bridge defined by thyristors 32, 33 connected to the main source $U_o$.

Figure 2:
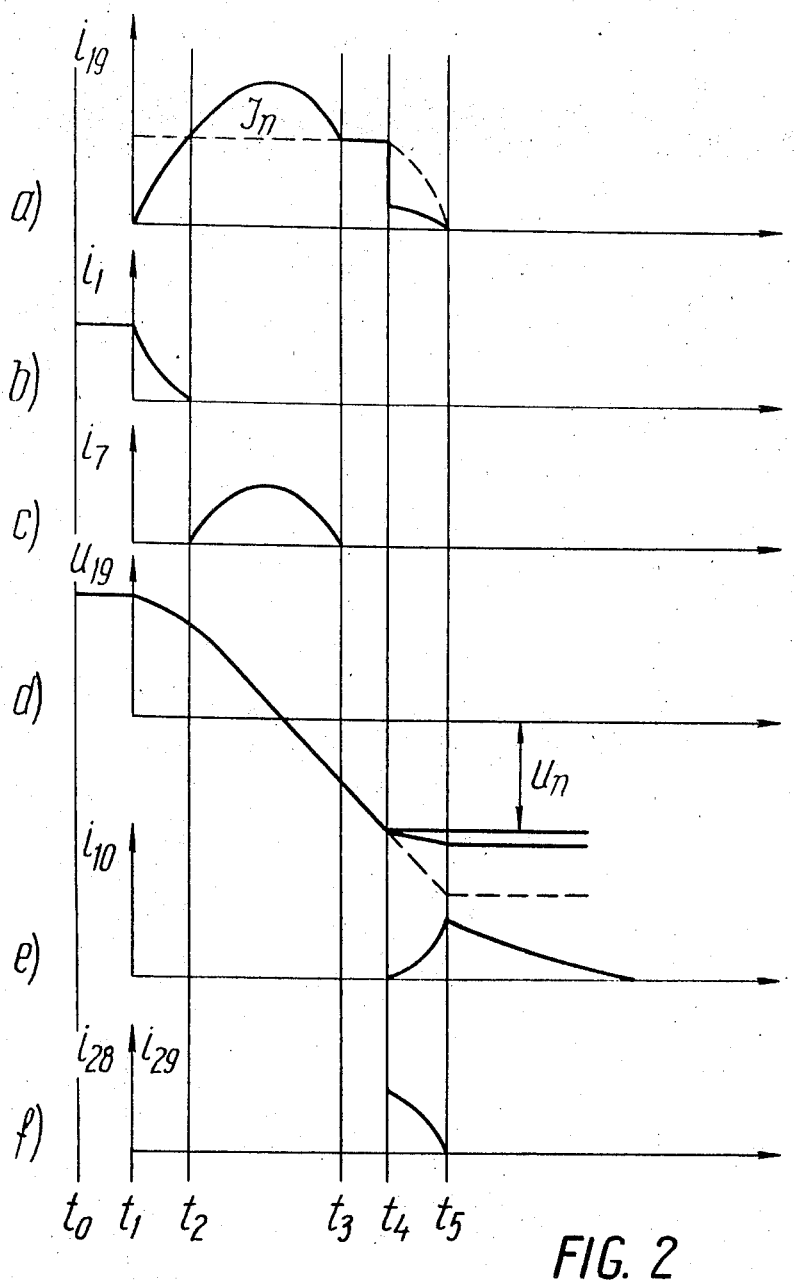
FIG. 2 ($a$–$f$) represents charts of inverter voltages and currents in accordance with FIG. 1.

The commutation process in the inverter circuit will be described starting at an instant $t_o$ (FIG. 2). It will be assumed that the main thyristors 1, 5 and 6 are in a conducting state, the switching capacitor 19 being charged to the voltage of the additional source $U_n$ with a polarity shown in FIG. 1. The voltage of the additional source $U_n$ is generally chosen to be equal to the maximum voltage across the source $U_o$ at the input of the inverter and is invariable for all output frequencies. At an instant $t_1$ a short control pulse is supplied to the auxiliary thyristors 32 and 13 thereby rendering them conducting.

The rise of current $1_{19}$ through the capacitor 19 follows the law of an oscillatory circuit: $+U_o$ — thyristor 32 — capacitor 19 — choke 20 — thyristor 13 — phase A — phase B — thyristor 6 — — $U_o$.

At an instant $t_2$, the discharge current of the capacitor 19 becomes equal to the load current $J_n$ of FIG. 2a, the magnitude of current $l_1$ of the thyristor 1 drops to zero and the thyristor 1 turns off (FIG. 2b), thereby dgiving rise to a new recharging circuit for the switching capacitor 19: thyristor 32 — capacitor 19 — choke 20 — thyristor 13 — diode 7 — thyristor 32. The current $l_7$ through the reverse-conducting diode 7 is equal to the difference between the current through the capacitor 19 and the load current $l_n$ (FIG. 2c), At an instant $t_3$, the current through the capacitor 19 decreases to the value of $l_n$ and the diode 7 is rendered nonconducting. During the time interval $t_3$–$t_4$, a practically constant load current flows through the capacitor 19 and the latter is recharged to the value of the inverter supply source voltage $U_o = U_n$ (FIG. 2d).

At an instant $t_4$, the reverse-conducting diode 10 (FIG. 2e) starts conducting current $l_{10}$, the reactive current of phase A forming a circuit: phase A — phase B — thyristor 6 — diode 10 — — phase A. At that instant it is desirable that a control pulse be fed to the thyristor 4 to speed up the process of reversal of the load current phase A.

Let us discuss the part played by the auxiliary diodes 28–31 in somewhat greater detail. During the time interval $t_4$–$t_5$, the current through the switching choke 20 drops to zero, it electromagnetic energy being fully transferred to the capacitor 19 causing a rise of voltage across the latter. Were it not for the diodes 28–31, the capacitor 19 would be charged to a voltage magnitude far exceeding the voltage across the source $U_n$ (the dotted line in FIG. 2d). In the arrangement discussed, as, say, the potential of the left-hand plate of the capacitor 19 rises to exceed the potential of the positive terminal of the additional source $U_n$, the pair of diodes 28 and 29 is fired letting the excessive energy of the capacitor 19 pass into an electrolytic capacitor 27 (currents $l_{29}$, $l_{29}$ in FIG. 2f) which has a far greater capacitance than the capacitor 19. This process occurs in the following circuit: capacitor 19 — diode 28 — diode 26 — capacitor 27 — diode 29 — capacitor 19. Thus, the diodes 28–31 permit maintaining the voltage across the switching capacitor 19 at a level practically equal to the voltage across the source $U_n$ under all operating conditions of the inverter, thereby minimizing overvoltages across all the elements of the system. It must be noted that the installed capacity of the diodes 28–31 is far below that of the main thyristors 1–6, for the former conduct pulse current over time intervals which are materially shorter than the period of working processes in the system.

Figure 3:
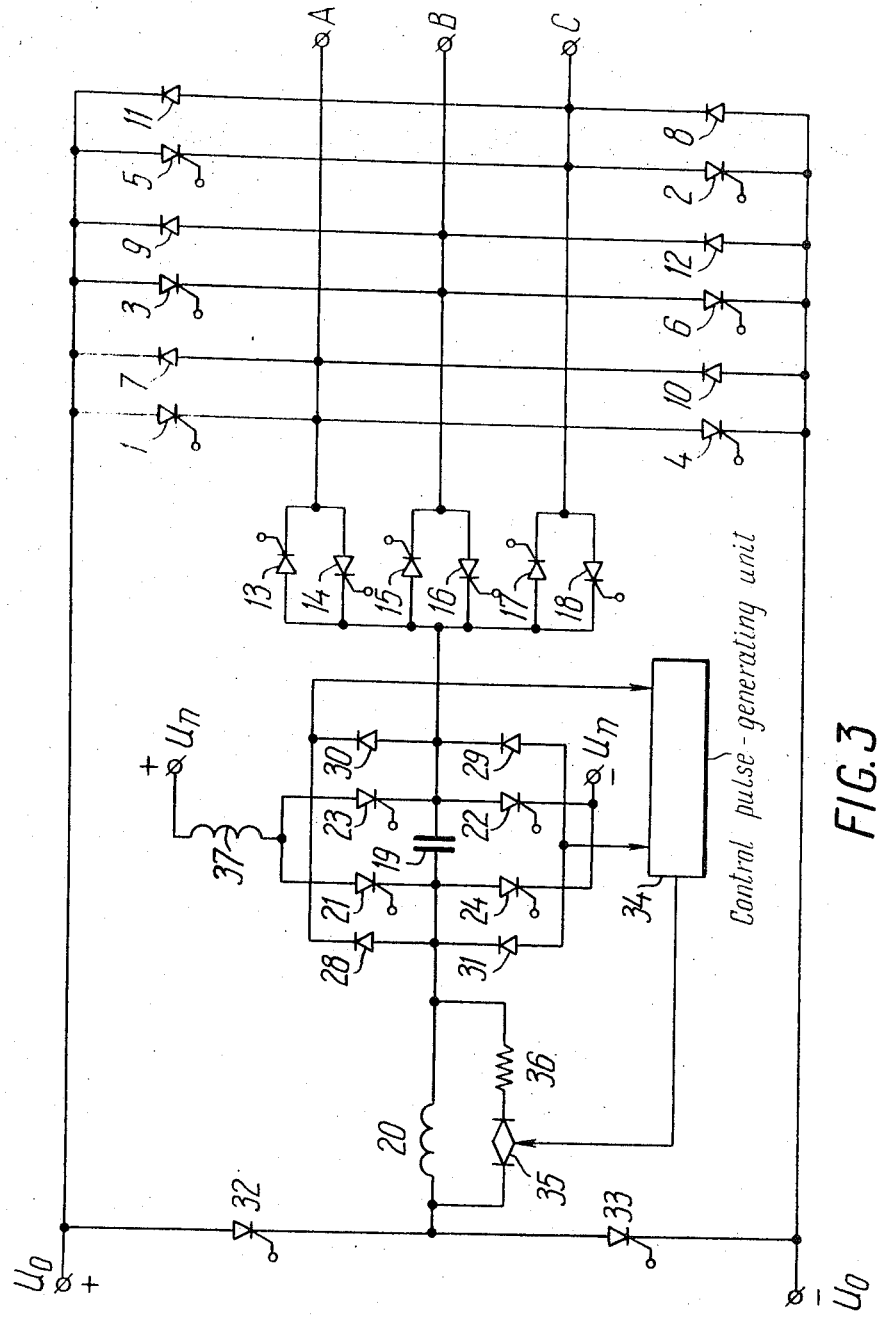
FIG. 3 is a schematic circuit diagram of an inverter wherein a control pulse-generating unit is coupled into a diagonal of a symmetrical bridge built around additional diodes.

Another form in which said inverter may be embodied is one wherein a control pulse-generating unit 34 is coupled into a diagonal of a symmetrical bridge defined by additional diodes 28–31 (FIG. 3), the output of the control pulse-generating unit is connected to the control electrode of a semistor 35; a resistor 36 is connected in series with the semistor 35 forming a string therewith which is connected in parallel with the switching choke 20; a symmetrical bridge of auxiliary thyristors 21–24 via a choke 37 is coupled to the positive pole of the additional D.C. source $U_n$.

Let us discuss the process of commutation in such an inverter. In order to turn off the thyristor 1, thyristors 32 and 13 are turned on and the precharged capacitor 19 is recharged in the following manner: thyristor 32 — choke 20 — capacitor 19 — thyristor 13 — diode 7, thereby turning the thyristor 1 off.

By the end of the commutation process as the voltage across the capacitor 19 attains the threshold magnitude, the control pulse-generating unit 34 formed in a well-known manner, for example as a blocking oscillator, fires the semistor 35 shunting the choke 20 with a resistor 36, thereby ruling out overvoltages across the switching capacitor 19.

Figure 4:
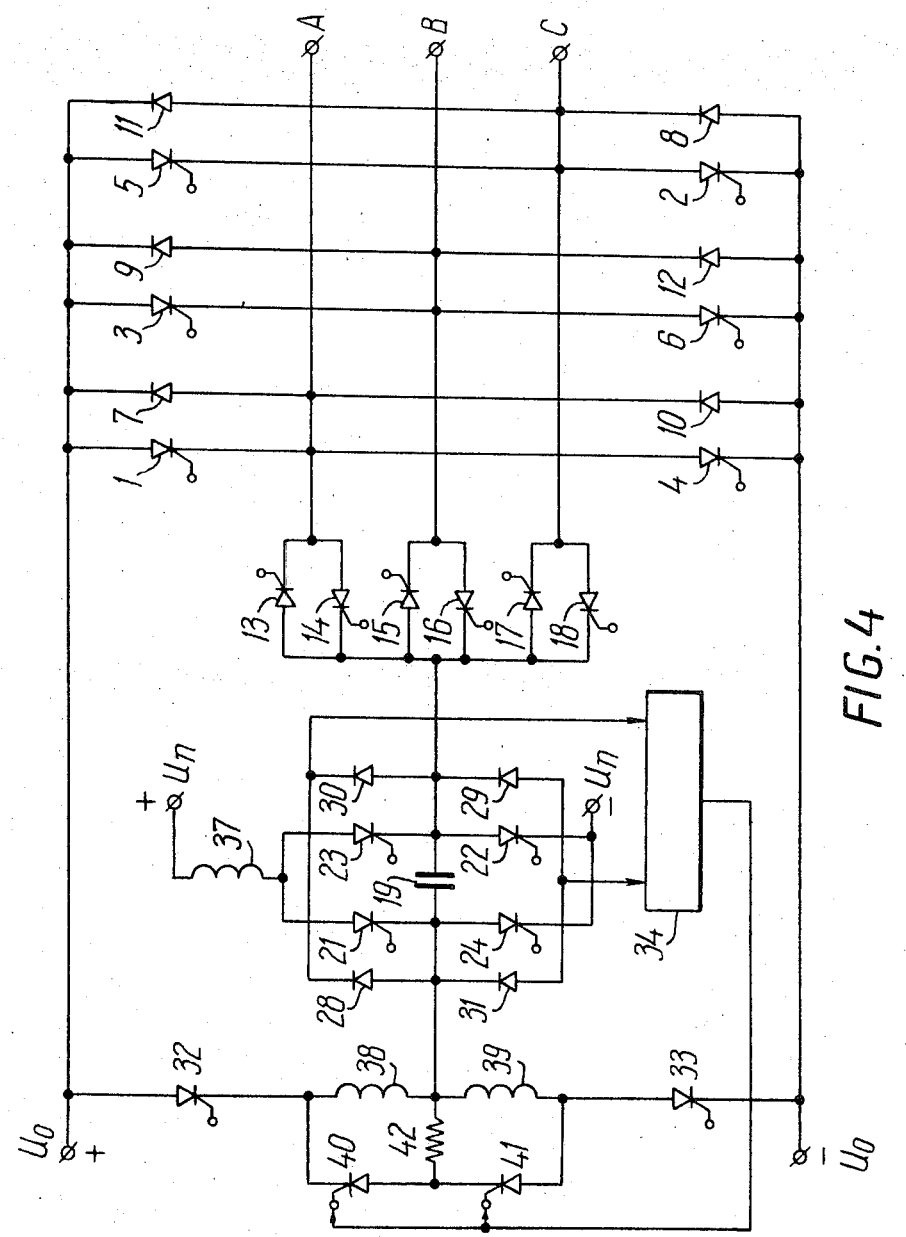
FIG. 4 is an embodiment of the inverter of FIG. 3, wherein a switching choke is formed by two half-windings.

The switching choke may be formed by two half-windings 38, 39 (FIG. 4) series-coupled into an arm of the bridge defined by the auxiliary thyristors 32, 33 and connected by way of their midpoint with the switching capacitor 19. In such a case, instead of the semistor, string of series-cupled thyristors 40, 41 with a single resistor 42 are coupled in shunt with the choke half-windings 38, 39, the control electrodes of the thyristors 40, 41 being connected to the output of the control pulse-generating unit 34.

Such a choke arrangement improves the reliability of the switching circuit. In this case, the inverter functions similarly to the one described above in accordance with FIG. 3, the sole difference being that in the latter arrangement the functions of the semistor 35 of FIG. 3 are exercised alternatively by the thyristors 40 and 41.

Inverters of this invention have been successfully tested in experimental thyristor frequency converters rated at up to 100 kW designed to regulate the speed of induction motors having a squirrel-cage rotor in the range of frequences from 3 to 60 Hz and for voltages varying from 0 to 380 v.

Such thyristor frequency converters operate on the principle of constant voltage-to-frequency ratio with the voltage drop compensated in the active resistance of the stator winding. Converter control provides for frequency start-up of the motor to any predetermined speed, smooth adjustment of rpm and frequency or dynamic retardation.

The converters of this type have protective circuits to guard the system against current overshoots, inversion disruption as well as internal and external short-circuits. The error of output voltage and converter frequency stabilization is 1 to 2 percent, the efficiency from 0.9 to 0.94 and the power factor from 0.90 to 0.95.

What is claimed is:

1. An inverter comprising: main controlled rectifiers arranged in a 3-phase bridge configuration and connected to a main D.C. source; reverse-conducting diodes shunting said main controlled rectifiers; a switching circuit comprising a switching capacitor and a switching choke coupled into a series string, as well as auxiliary controlled rectifiers interconnected so that one end of said string is coupled to three groups of said auxiliary rectifiers in mutual parallel opposition, each of which groups being connected with one of the arms of siad bridge defined by the main controlled rectifiers, the other end of said string is connected to an arm of a bridge made up of other of said auxiliary rectifiers coupled to said main D.C. source, whereas said switching capacitor is coupled into a diagonal of a symmetrical bridge defined by the remaining auxiliary controlled rectifiers coupled to an additional D.C. source; additional diodes arranged in a symmetrical bridge configuration and connected by way of one diagonal thereof to a diagonal of said symmetrical bridge defined by said auxiliary controlled rectifiers, which diagonal includes said switching capacitor; an additional capacitor coupled via a choke into the other diagonal of the symmetrical bridge defined by the additional diodes.

2. An inverter comprising: main controlled rectifiers arranged in a 3-phase bridge configuration and coupled to a main D.C. source; reverse-conducting diodes shunting said main controlled rectifiers; a switching circuit comprising a switching capacitor and a switching choke coupled into a series string as well as auxiliary controlled rectifiers interconnected so that one end of said string is connected to three groups of said auxiliary controlled rectifiers in mutual parallel opposition, each said group being connected with one of the arms of said bridge defined by the main controlled rectifiers, the other end of said string is connected to an arm of the bridge defined by other of said auxiliary rectifiers connected to said main D.C. source, whereas said switching capacitor is coupled into a diagonal of a symmetrical bridge defined by the remaining auxiliary rectifiers connected to an additional D.C. source; additional diodes arranged in a symmetrical bridge configuration coupled by way of a diagonal thereof to a diagonal of said symmetrical bridge defined by the auxiliary controlled rectifiers, which diagonal includes said switching capacitor; a control pulse-generating unit connected to the other diagonal of said symmetrical bridge defined by the additional diodes and connected via the output thereof with the circuit of said switching choke.

3. An inverter as of claim 2, wherein as said switching choke there is employed a choke with two half-windings series-coupled into an arm of said bridge defined by said auxiliary controlled rectifiers connected to said main D.C. source and coupled by way of the midpoint thereof with said switching capacitor, whereas said half-windings of said choke are shunted by strings of series-coupled controlled rectifiers and resistors, wherein the control electrodes of said rectifiers are connected with said control pulse-generating unit.

* * * * *